United States Patent
Inoue et al.

(10) Patent No.: US 12,032,698 B2
(45) Date of Patent: Jul. 9, 2024

(54) PROGRAM UPDATE CONTROL APPARATUS, PROGRAM UPDATE CONTROL METHOD AND COMPUTER-READABLE STORAGE MEDIUM

(71) Applicant: HONDA MOTOR CO., LTD., Tokyo (JP)

(72) Inventors: Genta Inoue, Tokyo (JP); Yosuke Shionoya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 17/673,821

(22) Filed: Feb. 17, 2022

(65) Prior Publication Data
US 2022/0300271 A1    Sep. 22, 2022

(30) Foreign Application Priority Data

Mar. 19, 2021  (JP) .................................. 2021-046141

(51) Int. Cl.
*G06F 3/12*   (2006.01)
*G06F 3/14*   (2006.01)
(Continued)

(52) U.S. Cl.
CPC ................. *G06F 21/57* (2013.01); *G06F 3/12* (2013.01); *G06F 3/14* (2013.01); *G06F 8/65* (2013.01); *H04L 67/12* (2013.01)

(58) Field of Classification Search
CPC ... G06F 8/65; G06F 3/14; G06F 21/57; G06F 21/572; G06F 3/12; G06F 3/1225; H04L 67/12
See application file for complete search history.

(56) References Cited

U.S. PATENT DOCUMENTS

2016/0107532 A1   4/2016  Park
2019/0315293 A1  10/2019  Arai
(Continued)

FOREIGN PATENT DOCUMENTS

| JP | 2020027635 A | 2/2020 |
| WO | 2018079004 A1 | 5/2018 |
| WO | 2019188073 A1 | 10/2019 |

OTHER PUBLICATIONS

Blaschke et al., DE 102016201279, (translation), Aug. 3, 2017, 18 pgs < DE_102016201279.pdf>.*

(Continued)

*Primary Examiner* — Tuan A Vu (57) ABSTRACT

A program update control apparatus comprises a rewriting control unit configured to perform control of rewriting a program, which is executed by a mobile object control unit configured to control at least a part of a mobile object, to a new program; and an acquisition unit configured to acquire the new program from an external apparatus, wherein the rewriting control unit is configured: before starting the rewriting, to request a user to consent to execution of the rewriting, and to hold consent information, which indicates that the user has consented to execution of the rewriting, and when activated in response to a power supply being on, to cause the rewriting to be executed without requesting the user to consent to execution of the rewriting, on the condition that the consent information is held.

20 Claims, 9 Drawing Sheets

(51) Int. Cl.
   *G06F 8/65*    (2018.01)
   *G06F 21/57*   (2013.01)
   *H04L 67/12*   (2022.01)

(56) References Cited

U.S. PATENT DOCUMENTS

| | | | |
|---|---|---|---|
| 2020/0050442 A1* | 2/2020 | Sakurai | H04L 67/12 |
| 2021/0157573 A1* | 5/2021 | Abe | G06F 3/14 |
| 2021/0165649 A1 | 6/2021 | Harata | |
| 2021/0191661 A1 | 6/2021 | Harata | |

OTHER PUBLICATIONS

Throop et al., DE 102015103995 (translation), Oct. 1, 2015, 10 pgs <DE_102015103995.pdf>.*
Liu et al., CN 103257869, (translation), Aug. 21, 2013, 5 pgs <CN_103257869.pdf>.*
Office Action issued for counterpart Japanese Application No. 2021-046141, issued by the Japanese Patent Office dated Dec. 20, 2022 (drafted on Dec. 16, 2022).

* cited by examiner

| ECU ID | PROGRAM ID | STATUS |
|---|---|---|
| E001 | P001 | CONSENT ACQUISITION COMPLETED WRITING |
| E002 | P002 | WRITING COMPLETED CONSENT ACQUISITION COMPLETED |

PROGRAM UPDATE CONTROL APPARATUS, PROGRAM UPDATE CONTROL METHOD AND COMPUTER-READABLE STORAGE MEDIUM

The contents of the following Japanese patent application(s) are incorporated herein by reference:
NO. 2021-046141 filed on Mar. 19, 2021.

BACKGROUND

1. Technical Field

The present invention relates to a program update control apparatus, a program update control method and a computer-readable storage medium.

2. Related Art

Patent Document 1 discloses, as an ECU for a vehicle, an ECU capable of rewriting an application program.
Patent Document 1: Japanese Patent Application Publication No. 2020-27666

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
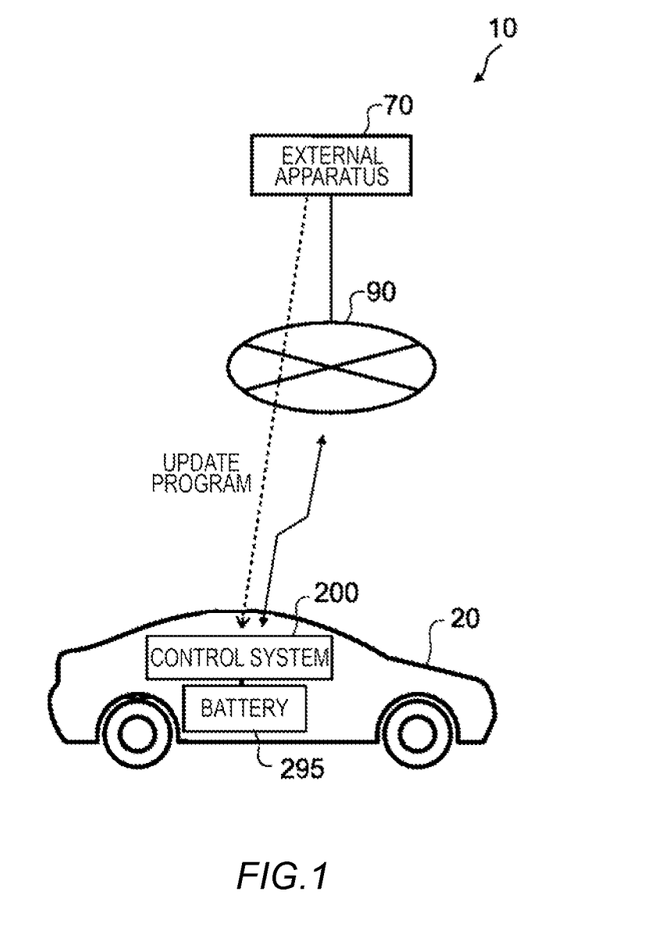
FIG. 1 schematically shows an update system 10 according to one embodiment.

FIG. 1 schematically shows an update system 10 according to one embodiment. The update system 10 includes a vehicle 20 and an external apparatus 70. The vehicle 20 includes a control system 200. The control system 200 is responsible for control of the vehicle 20 and communication with the external apparatus 70 via a communication network 90. The communication network 90 includes an IP network such as the Internet, a P2P network, a dedicated line including a VPN, a virtual network, a mobile communication network, and the like.

In the vehicle 20, the control system 200 includes a plurality of ECUs (Electronic Control Units) configured to perform control of the vehicle 20. The control system 200 is configured to acquire an update program of the ECU provided to the control system 200 from an outside. For example, the control system 200 is configured to receive an update program, which is transmitted from the external apparatus 70, via the communication network 90 by wireless communication. The control system 200 is configured to reprogram the ECU provided to the control system 200 by rewriting a program, which is executed by the ECU provided to the control system 200, with the update program. Such reprogramming is performed for upgrade and the like of functions of the ECU provided to the control system 200. In this way, the control system 200 is configured to update the ECU by reprogramming the ECU by OTA (Over The Air). In the present embodiment, rewriting a program, which is executed by a device such as the ECU, by the update program is referred to as 'program update'.

At least a part of processing relating to the program update of the ECU is executed when an IG power supply of the vehicle 20 is off. For example, when the IG power supply becomes off, the control system 200 is configured to acquire a user's consent to execute the program update. When the control system 200 acquires the user's consent to execution of the program update, the control system is configured to store consent information, which indicates that the user has consented to execution of the program update, and to start predetermined processing, which is to be executed in a state where the IG power supply is off, of the processing relating to the program update.

When the IG power supply of the vehicle 20 is off, electrical power necessary for the program update is supplied from a battery of a power supply voltage 12V provided to the vehicle 20. For this reason, when the user removes the battery of the vehicle 20 after the IG power supply becomes off and the program update is started, the electrical power for continuing the program update cannot be supplied to the control system 200, so that the program update is interrupted. When the user remounts a battery 295, the control system 200 is activated by the electrical power supplied from the battery. At this time, in a case where the control system 200 holds the consent information, the control system resumes the program update without reacquiring the consent information. In this way, according to the control system 200, even if a case occurs in which the electrical power is not supplied due to an external factor such as the user removing the battery, the program update can be continued without reacquiring the user's consent when the electrical power supply is restored.

Figure 2:
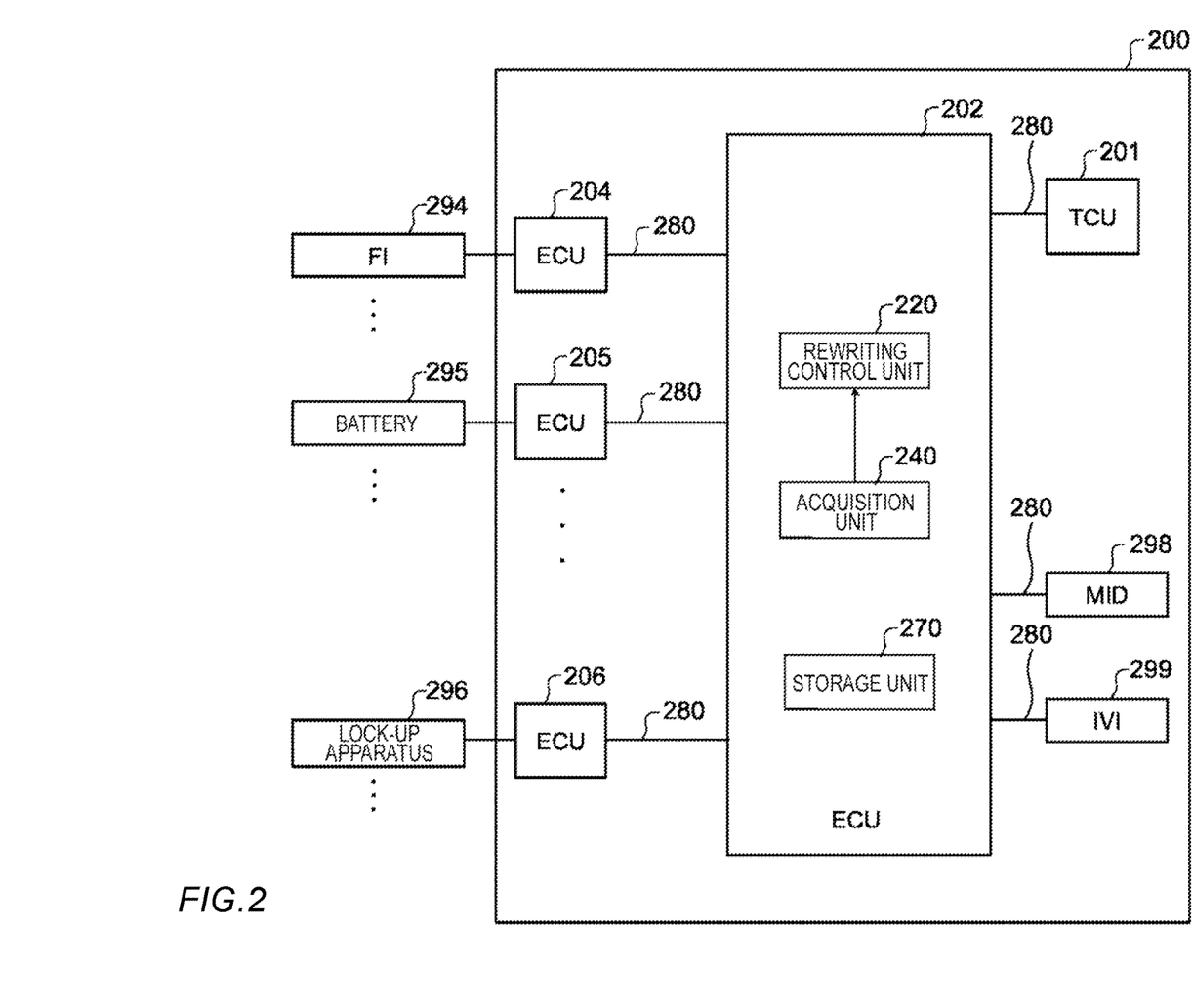
FIG. 2 schematically shows a system configuration provided to a control system 200, together with a to-be-controlled device.

FIG. 2 schematically shows a system configuration provided to the control system 200, together with a to-be-controlled device. The control system 200 has a TCU 201, an ECU 202, an ECU 204, an ECU 205, an ECU 206, an MID 298, and an IVI 299.

The ECU 202 is connected to the TCU 201, the ECU 204, the ECU 205 and the ECU 206 via an in-vehicle communication line 280. The ECU 202 is configured to mutually communicate with the TCU 201, the ECU 204, the ECU 205, the ECU 206, the MID 298 and the IVI 299 via the in-vehicle communication line 280. The ECU 202 is configured to collectively control the TCU 201, the ECU 204, the ECU 205, the ECU 206, the MID 298 and the IVI 299. The in-vehicle communication line 280 may be configured to include a CAN (Controller Area Network), an Ether Network and the like, for example.

The TCU 201 is a telematics control unit. The TCU 201 is mainly responsible for mobile communication. The TCU 201 is configured to transmit and receive data to and from the external apparatus 70, based on control of the ECU 202. The TCU 201 is configured to receive the update program transmitted from the external apparatus 70 by mobile communication, based on control of the ECU 202. The TCU 201 can function as a wireless communication unit.

The MID 298 is a multi-information display. The IVI 299 is, for example, an in-vehicle infotainment information device (IVI). The MID 298 and the IVI 299 can function as a display control unit. The IVI 299 has a wireless LAN communication function. The IVI 299 is configured to receive the update program transmitted from the external apparatus 70 by wireless LAN communication, based on control of the ECU 202.

The ECU 204, the ECU 205 and the ECU 206 are each an ECU as a vehicle control unit configured to control at least a part of the vehicle 20. The ECU 204, the ECU 205 and the ECU 206 are examples of the 'mobile object control unit'. The ECU 204, the ECU 205 and the ECU 206 are configured to control a variety of devices provided to the vehicle 20. For example, the ECU 204 is configured to control an FI 294, which is a fuel injection apparatus, and the like. The ECU 205 is configured to control the battery 295, and the like. The battery 295 functions as a 12V power supply for a vehicle, for example. The battery 295 is, for example, a lead storage battery or the like. Note that, in FIG. 2, the FI 294, the battery 295 and a lock-up apparatus 296 are examples of the to-be-controlled device provided to the vehicle 20, and the vehicle 20 may have a to-be-controlled device other than the devices shown in FIG. 2.

In the present embodiment, the system configuration where the control system 200 includes the TCU 201, the ECU 202, the ECU 204, the ECU 205, the ECU 206, the MID 298 and the IVI 299 is exemplified. However, the system configuration of the control system 200 is not limited to the example of the present embodiment. In addition, in the present embodiment, as an example, it is described that the mobile object control unit that may be a target of the program update is the ECU 204 and the ECU 205 and the ECU 202 functions as a 'program update control apparatus' configured to control the program update. Note that, the mobile object control unit that may be a target of the program update is not limited to these ECUs. The mobile object control unit that may be a target of the program update may be any of the TCU 201, the ECU 202, the ECU 204, the ECU 205, the ECU 206, the MID 298 and the IVI 299.

The ECU 202 is configured to function as a program update control apparatus configured to control the program update of the ECU. The ECU 202 includes a rewriting control unit 220, an acquisition unit 240, and a storage unit 270.

The rewriting control unit 220 is configured to perform control of rewriting a program, which is executed by the ECU configured to control at least a part of the vehicle 20, to a new program. The acquisition unit 240 is configured to acquire a new program from the external apparatus. Before starting the rewriting, the rewriting control unit 220 is configured to request the user to consent to execution of the rewriting, and to hold consent information, which indicates that the user has consented to execution of the rewriting. When activated in response to the power supply being on, the rewriting control unit 220 is configured to cause the rewriting to be executed without requesting the user to consent to execution of the rewriting, on the condition that the consent information is held.

The rewriting control unit 220 may be configured to further hold execution state information indicative of an execution state of rewriting. When activated in response to the power supply being on, the rewriting control unit 220 is configured to cause rewriting of a program to be resumed, based on the held execution state information, on the condition that the consent information is held.

The rewriting control unit 220 may be configured to hold identification information for identifying an ECU that is an execution target of rewriting. When activated in response to the power supply being on, the rewriting control unit 220 is configured to cause an ECU identified with the identification information to be activated and to cause the ECU to execute rewriting, on the condition that the consent information is held.

The program update of an ECU having a plurality of storage areas as a storage area of a program is described. In the present embodiment, it is assumed that the ECU 205 has a plurality of storage areas. The ECU 205 may include a storage unit having a first storage area and a second storage area. The ECU 205 is configured to read either a program stored in the first storage area or a program stored in the second storage area at boot-up. In a case where a program that is executed by the ECU 205 is stored in the first storage area, the rewriting control unit 220 is configured to cause writing of a new program to the second storage area to be started. When activated in response to the power supply being on, the rewriting control unit 220 is configured to determine whether the new program is being rewritten, based on the execution state information, on the condition that the consent information is held, and when it is determined that the new program is being rewritten, the rewriting control unit is configured to cause the ECU 205 to resume writing of the new program.

The program update of an ECU having a single storage area as a storage area of a program is described. In the present embodiment, it is assumed that the ECU 204 has a single storage area. The ECU 204 includes a storage unit having a single storage area configured to store a program that is executed by the ECU 204. When starting rewriting, the rewriting control unit 220 is configured to erase an area in which the program in the storage area is stored, and to cause the ECU 204 to start writing of a new program into the storage area. When activated in response to the power supply being on, the rewriting control unit 220 is configured to determine whether the new program is being rewritten, based on the execution state information, on the condition that the consent information is held, and when it is determined that the new program is being rewritten, the rewriting control unit is configured to cause the ECU 204 to erase the new program that is being written into the storage area, and to cause the ECU 204 to resume writing of the new program.

The ECU 202 is electrically connected to the battery 295. In a case where the ECU 202 is electrically connected to the battery 295, the ECU 202 can operate with the electrical power supplied from the battery 295. In a case where the battery 295 is mounted on the vehicle 20, the rewriting control unit 220 is configured to sense that the battery 295 is mounted on the vehicle 20, based on a signal that is output from the battery 295 in response to the battery 295 being mounted on the vehicle 20, and to be activated by the electrical power supplied from the battery 295. For example, the ECU 202 is connected to a power supply system including the battery 295 by a power supply line, and is activated by the electrical power supplied from the power supply line.

Note that, the ECU 202 may be configured to acquire a signal, which is generated in response to the battery 295 being mounted, from the power supply system including the battery 295 through a signal line connected to the power supply system. When activated by the electrical power supplied from the battery 295, the rewriting control unit 220 is configured to cause the rewriting to be executed without requesting the user to consent to execution of the rewriting, on the condition that the consent information is held.

Here, the program update is described. Program update processing that is executed when a device that is a target of the program update is an ECU and a memory for firmware storage of the ECU is a single bank memory (so-called singled-sided ROM) is described. In this case, since a program storage area for firmware storage of the ECU is one, the update program cannot be written to the program storage area when the ECU is operating according to a program stored in the program storage area. When performing the program update of the ECU, the rewriting control unit 220 is configured to transfer the update program to the ECU, to cause the update program to be stored in a predetermined data storage area of the ECU, and thereafter, to instruct the ECU for the program update. When the program update is instructed, the ECU is configured to execute a control code for performing the program update, to write the update program transferred to the data storage area to the program storage area, and to activate the update program. The activation of the update program includes, for example, processing of setting an activation parameter of the ECU so as to start control based on the update program by loading the update program at boot-up of the ECU.

Next, program update processing that is executed when a storage unit provided to an ECU is a double bank memory (so-called double-sided ROM) is described. In this case, since the ECU has two program storage areas for firmware storage, the update program can be written to a second program storage area when the ECU is operating according to a program stored in a first program storage area. That is, by so-called backside writing, the update program can be written to the second program storage area that is a backside. Therefore, for example, even when the vehicle 20 is traveling, the update program can be written to the second program storage area. For this reason, when the rewriting control unit 220 transfers the update program to the ECU, the rewriting control unit instructs the ECU to write the update program to the second program storage area. When the writing of the update program to the second program storage area of the ECU is completed, a state where the program update of the ECU can be performed becomes. When the rewriting control unit 220 performs the program update of the ECU, the rewriting control unit 220 instructs the ECU to activate the update program written to the second program storage area. The activation of the update program includes, for example, processing of setting an activation parameter of the ECU so as to start control based on the update program by loading the update program stored in the second program storage area at boot-up of the ECU. For example, the activation of the update program includes processing of enabling the second program storage area as a program reading area and disabling the first program storage area as a program reading area. Like this, the 'program update' is a concept that includes instructing to write the update program to the program storage area of the ECU. In addition, the 'program update' is a concept that includes instructing to activate the update program written to the program storage area.

In the program update of the ECU including a storage unit of a single bank memory, there occurs a possibility that the ECU cannot control the vehicle during a period for which the update program is written to the program storage area and during a period for which the update program is activated. On the other hand, in the program update of the ECU including a storage unit of a double bank memory, the ECU can control the vehicle during a period for which the update program is written to the program storage area of a backside. In the present embodiment, it is described that the ECU 204 has a single bank memory and the ECU 205 has a double bank memory.

Figure 3:
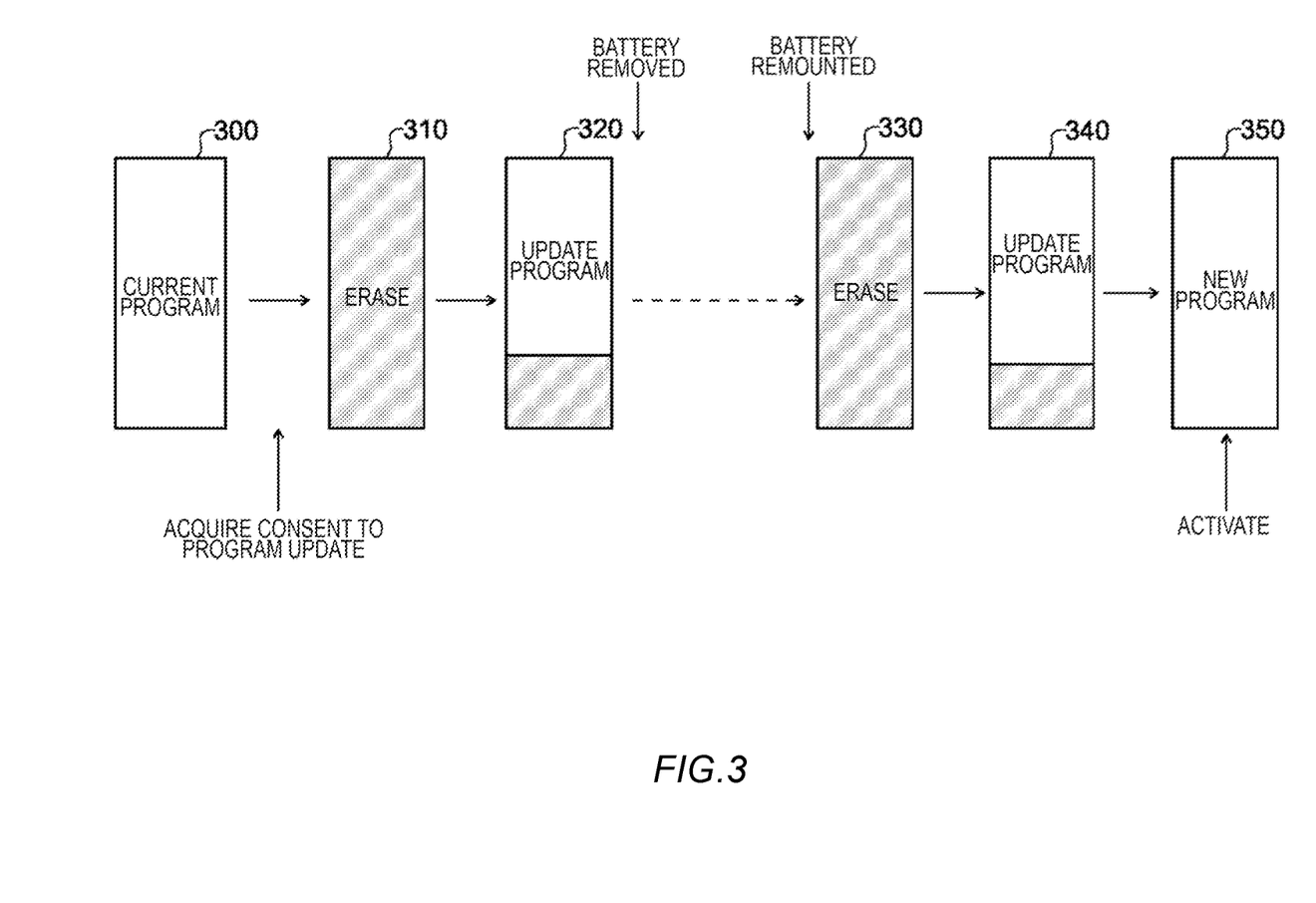
FIG. 3 is a schematic view showing in chronological order processing in a case where a battery 295 is removed when performing a program update of an ECU 204.
Figure 4:
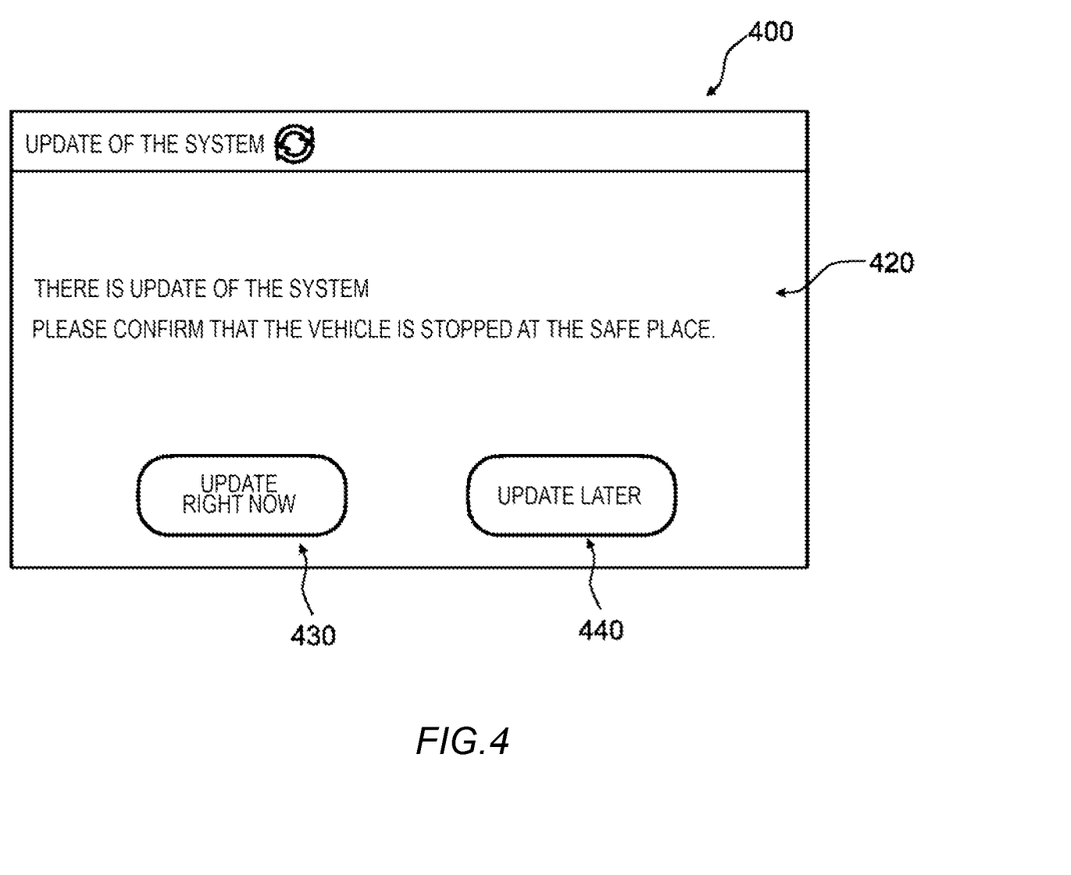
FIG. 4 shows an example of a consent acquisition screen 400.

FIG. 3 is a schematic view showing in chronological order processing in a case where the battery 295 is removed when performing a program update of the ECU 204. A reference sign 300 indicates a state where a current program that is executed by the ECU 204 is written to a program storage area of a single bank memory that is a storage unit provided to the ECU 204. If a download of an update program for the ECU 204 from the external apparatus 70 is completed, the rewriting control unit 220 acquires a user's consent to the program update when the IG power supply becomes off. For example, the rewriting control unit 220 causes the IVI 299 to display a consent acquisition screen 400 shown in FIG. 4. The consent acquisition screen 400 includes message information 420 for a user, a UI button 430 for acquiring a user's consent to the program update, and a UI button 440 for acquiring, from the user, an effect that the user does not consent to the program update. When a position of the UI button 430 is operated, the rewriting control unit 220 determines that the user has consented to the program update, and stores the consent information in the storage unit 270.

When the user's consent to the program update is obtained, the rewriting control unit 220 erases information stored in the program storage area (a reference sign 310) and starts writing of the update program to the program storage area (a reference sign 320). When the user removes the battery 295 while the rewriting control unit 220 is writing the update program to the program storage area, the writing processing ends due to a power supply failure, in a state where the wiring processing of the update program is not completed. When the user remounts the battery 295 on the vehicle 20, the rewriting control unit 220 activates the ECU 204, causes the ECU 204 to execute processing of erasing information stored in the program storage area to which the update program is being written (a reference sign 330), transfers the update program to the ECU 204, and causes the update program to be written in the program storage area from the beginning. When the writing of the update program is completed (a reference sign 350), the rewriting control unit 220 causes the ECU 204 to execute activation of the update program. This completes the program update of the ECU 204.

Figure 5:
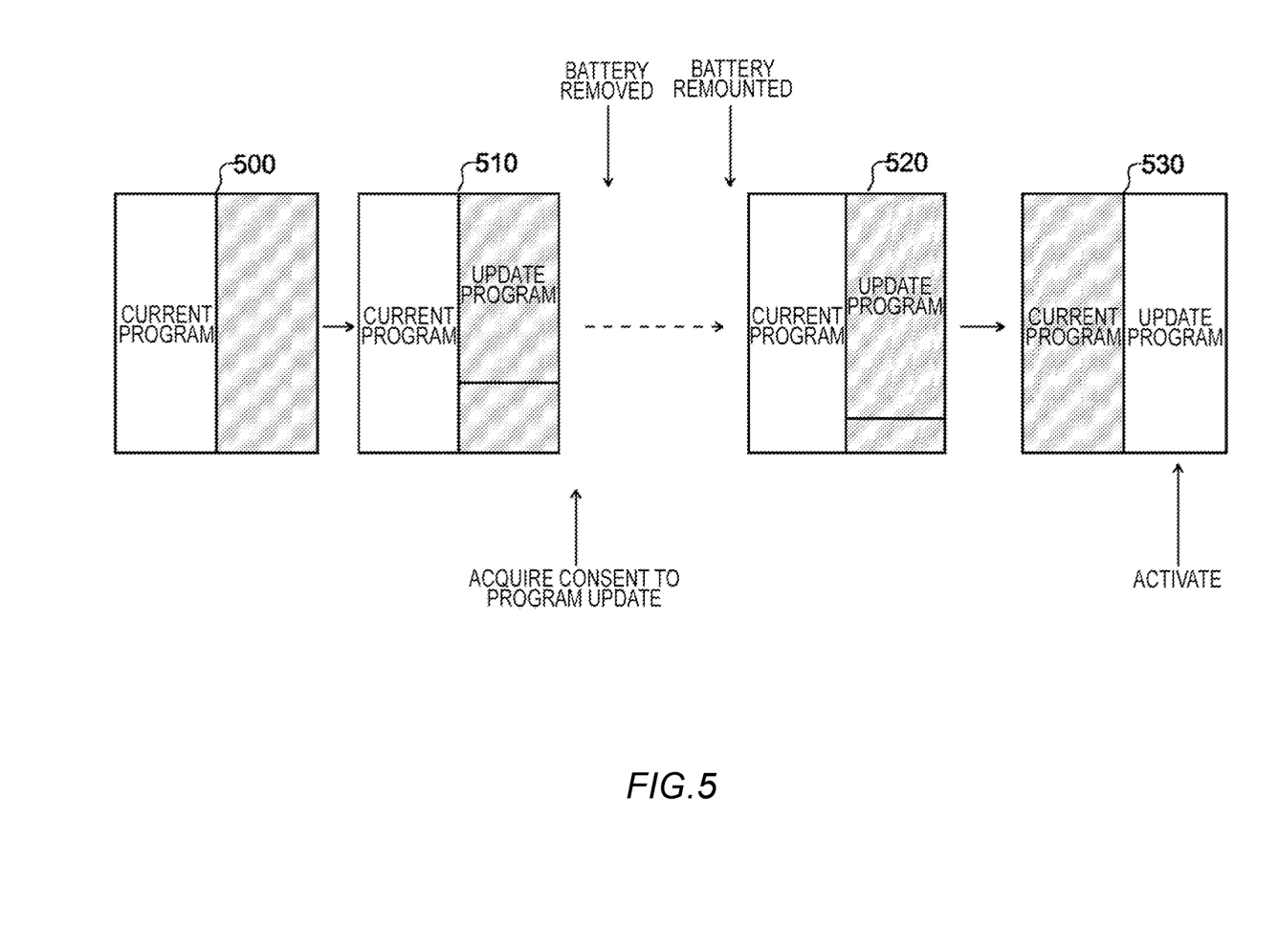
FIG. 5 is a schematic view showing in chronological order processing in a case where the battery 295 is removed when performing a program update of an ECU 205.

FIG. 5 is a schematic view showing in chronological order processing in a case where the battery 295 is removed when performing a program update of the ECU 205. A reference sign 500 indicates a state where a current program that is executed by the ECU 205 is written to the first program storage area of a double bank memory that is a storage unit provided to the ECU 205. If a download of an update program for the ECU 205 from the external apparatus 70 is completed, the rewriting control unit 220 starts writing of the update program to the second program storage area (a reference sign 510). The ECU 205 performs writing of the update program to the second program storage area, in response to an instruction from the rewriting control unit 220, while performing control during traveling of the vehicle 20 by the current program stored in the first program storage area. As described in connection with FIG. 3 and the like, when the IG power supply becomes off, the rewriting control unit 220 acquires the user's consent to the program update and stores the consent information in the storage unit 270. Note that, FIG. 5 shows a case where the writing of the update program to the second program storage area is not completed at the time when the IG power supply becomes off.

When the user removes the battery 295 while the rewriting control unit 220 is writing the update program to the second program storage area, the writing processing ends due to a power supply failure, in a state where the wiring processing of the update program is not completed. When the user remounts the battery 295 on the vehicle 20, the rewriting control unit 220 resumes writing of the update program to the second program storage area from a state where the writing has been completed before the battery 295 is removed. When the writing of the update program to the second program storage area is completed, the rewriting control unit 220 causes the ECU 205 to execute activation of the update program (a reference sign 530). This completes the program update of the ECU 205.

Note that, in the present embodiment, when the battery 295 is remounted after the battery 295 is removed while the update program is being written, it is assumed that, for the ECU having the single bank memory, the program storage area is once erased and then the update program is written from the beginning. On the other hand, it is assumed that, for the ECU having the double bank memory, information of a part whose writing to the program storage area has been completed is held and writing of only a part of the update program whose writing to the program storage area is not completed is performed. However, even for the ECU having the single bank memory, an aspect may be adopted in which the program storage area is not once erased and writing of only a part of the update program whose writing to the program storage area is not completed is performed. Further, for the ECU having the double bank memory, an aspect may be adopted in which the program storage area is once erased and then the update program is written from the beginning.

Figure 6:
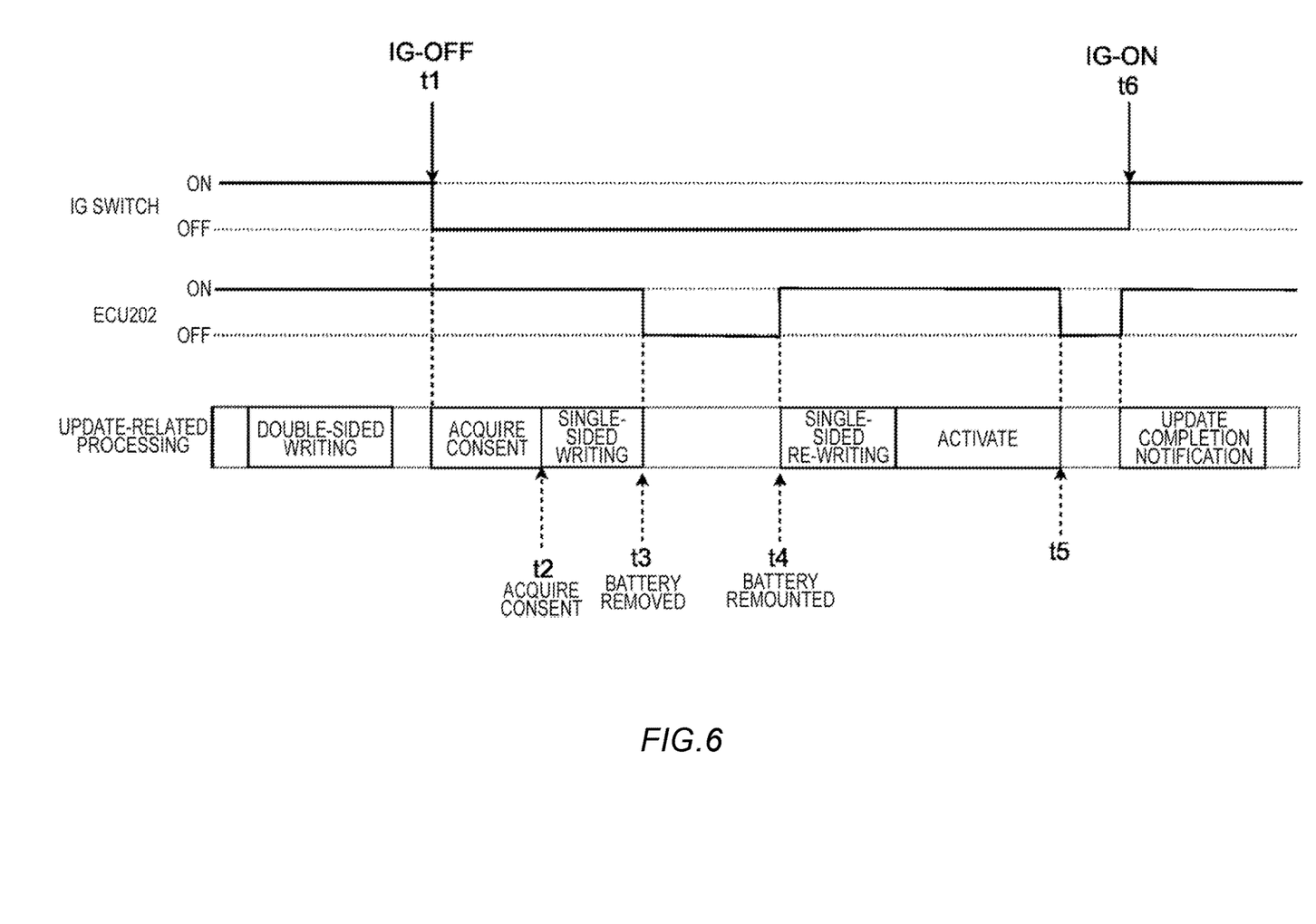
FIG. 6 schematically shows a time chart relating to program update processing.

FIG. 6 schematically shows a time chart relating to program update processing. FIG. 6 shows a state of an IG switch, a power supply state of the ECU 202, and an execution state of program update-related processing that is executed in the control system 200. Note that, FIG. 6 is a time chart when performing the program update of the ECU 204 and the ECU 205. Here, it is assumed that the writing of the update program to the ECU 205 is completed before the IG power supply becomes off.

Before the IG switch becomes off at time t1, the writing of the update program of the ECU 205 including the double bank memory to the second program storage area is completed (double-sided writing). When the IG switch becomes off at time t1 by the user, the rewriting control unit 220 causes the IVI 299 to display the consent acquisition screen 400 so as to acquire a user's consent to the program update. Note that, when there is an update program, the power supply state of the ECU 202 becomes on so as for the ECU 202 to enable processing relating to the program update. When a user's consent to the update program is acquired through IVI 299 at time t2, the content of the program storage area of the ECU 204 is erased and the writing of the update program is started, as described in connection with FIG. 3 and the like (single-sided writing).

When the battery 295 is removed at time t3, the power supply state of the ECU 202 becomes off. Thereby, the processing ends in a state where the writing of the update program of the ECU 204 is not completed. When the battery 295 is remounted at time t4, the rewriting control unit 220 erases the content of the program storage area of the ECU 204 and starts the writing of the update program from the beginning, as described in connection with FIG. 3 and the like. When the writing of the update program is completed, the rewriting control unit 220 causes the ECU 204 and the ECU 205 to execute activation of the update program. When the activation is completed at time t5, the power supply state of the ECU 202 becomes off.

When the IG switch becomes on at time t6, the rewriting control unit 220 causes the IVI 299 to display an update end screen, which indicates that the program update is over, thereby notifying the user that the program update is completed. In this way, according to the control system 200, even if the battery power supply fails during the program update, the program update processing is automatically resumed when the battery power supply is restored, and therefore, the program update can be automatically continued.

Figure 7:
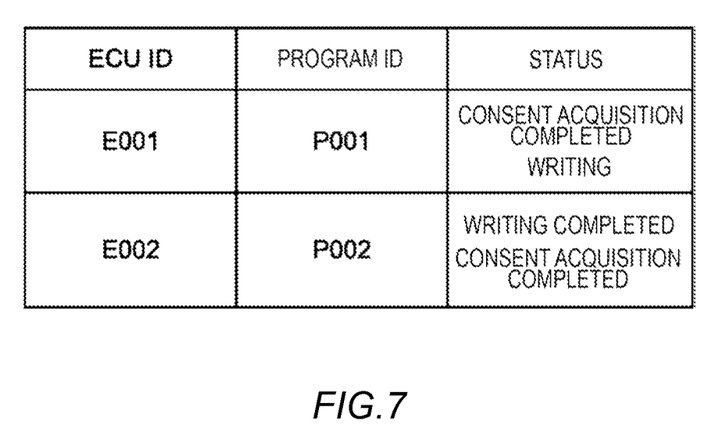
FIG. 7 shows an example of a data structure of update information that is managed by an ECU 202.

FIG. 7 shows an example of a data structure of update information that is managed by the ECU 202. The update information is information that associates an 'ECU ID', a 'program ID' and an 'update status'. The update information is stored in the storage unit 270 of the ECU 202.

The 'ECU ID' is identification information for identifying an ECU that is a target of the program update. The 'program ID' is identification information for identifying an update program. The 'update status' is information indicative of a status of the program update.

The 'update status' includes 'downloading', 'writing', 'writing completed', 'acquiring consent', 'consent acquisition completed', 'activating', 'notifying activation completion', and the like. 'Downloading' indicates that the ECU 202 is receiving the update program from the external apparatus 70. 'Writing' indicates that the update program is being written to the program storage area in the ECU that is an update target. 'Writing completed' indicates that the writing of the update program to the program storage area in the ECU that is an update target has been completed. 'Acquiring consent' indicates that a user's consent to the program update is being acquired. 'Acquiring consent' indicates a state where the consent acquisition screen 400 is being displayed. 'Consent acquisition completed' is an example of the consent information indicating that the user's consent to the program update has been obtained, for example, through the consent acquisition screen 400. 'Activating' indicates that activation is being executed. 'Notifying activation completion' indicates, for example, a state where the update end screen is being displayed. 'Downloading', 'writing', 'writing completed', 'acquiring consent', 'consent acquisition completed', 'activating' and 'notifying activation completion' are examples of information indicative of an execution state of the program update.

The rewriting control unit 220 updates the update information stored in the storage unit 270, according to a progress of the program update. The update information exemplified in FIG. 7 shows the update information stored in the storage unit 270 at time t3 of the time chart shown in FIG. 6. 'E001' in FIG. 7 is identification information of the ECU 204, and 'E002' is identification information of the ECU 205. At time t3, since the user's consent to the program update has been acquired, 'consent acquisition completed' is set for both the ECU IDs 'E001' and 'E002'. Since the update program of the ECU 204 is being written at time t3, 'writing' is set for the ECU ID 'E001'. Since the writing of the update program in the ECU 205 has been completed at time t3, 'writing completed' is set for the ECU ID 'E002'. When activated by restoring of the power supply, the rewriting control unit 220 refers to the update information stored in the storage unit 270, and when there is an ECU for which the program update has not been completed, the rewriting control unit resumes the program update according to the update information. The rewriting control unit 220 deletes the update information from the storage unit 270 when the program update is completed.

Figure 8:
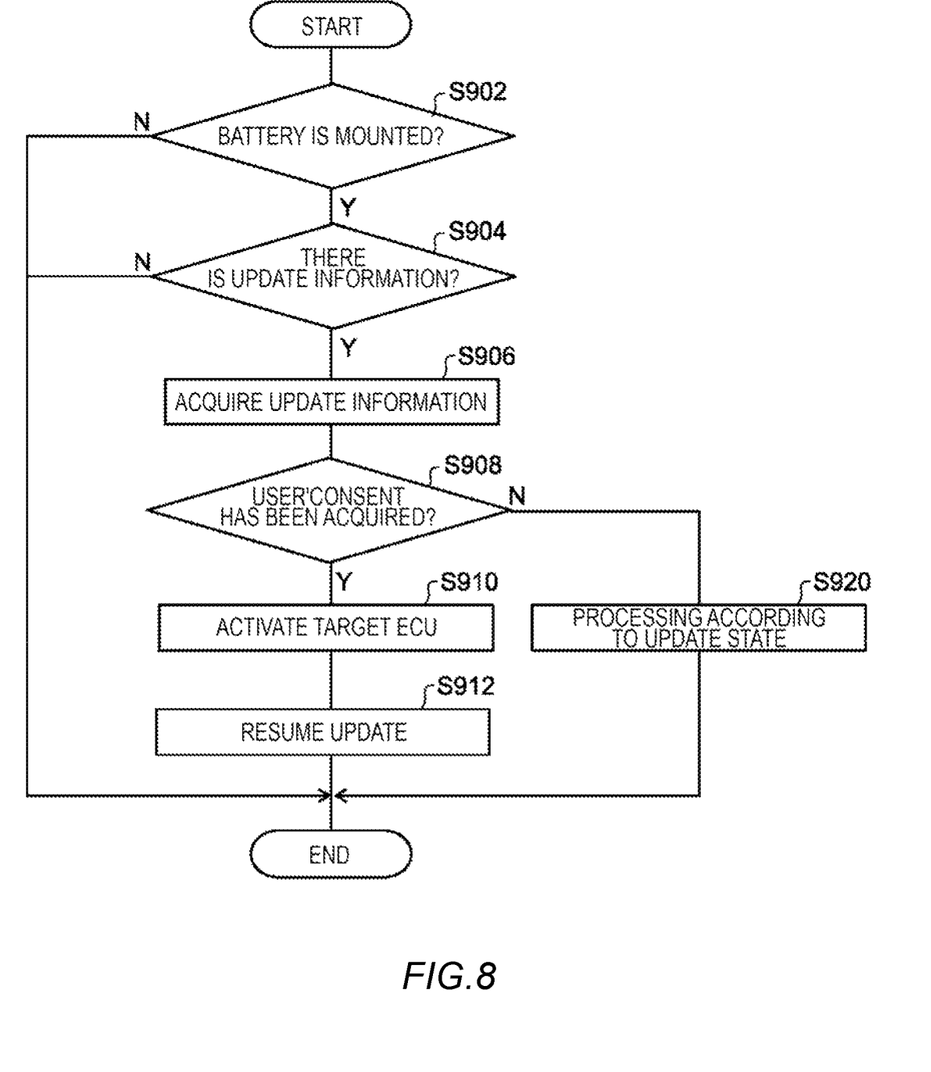
FIG. 8 is a flowchart showing an execution procedure of update resuming processing that is executed by the ECU 202.

FIG. 8 is a flowchart showing an execution procedure of update resuming processing that is executed by the ECU 202. The processing of the flowchart of FIG. 8 is performed after the electrical power is started in the ECU 202 and the activation of the ECU 202 is completed.

In S902, the rewriting control unit 220 determines whether it is activated by mounting of the battery 295 on the vehicle 20. For example, when the rewriting control unit 220 detects a signal that is output from the power supply system including the battery 295 in response to the battery 295 being mounted, the rewriting control unit determines that it is activated by mounting of the battery 295 on the vehicle 20. When it is not determined that the rewriting control unit is activated by mounting of the battery 295 on the vehicle 20, the processing of the present flowchart ends. When it is determined that the rewriting control unit is activated by mounting of the battery 295 on the vehicle 20, the rewriting control unit 220 determines whether the update information is stored in the storage unit 270, in S904. When the update information is not stored in the storage unit 270, the processing of the present flowchart ends.

When the update information is stored in the storage unit 270, the update information is acquired from the storage unit 270, in S906. In S908, the rewriting control unit 220 determines whether a user's consent to the program update has been acquired, based on the update information. For example, when the status of the update information includes 'consent acquisition completed', it is determined that the user's consent to the program update has been acquired.

When the user's consent to the program update has been acquired, the rewriting control unit 220 activates an ECU that is a target of the program update, in S910. For example, an ECU that is a target of the program update is specified based on the identification information of the ECU that is a target of the program update, which is included in the update information, and the specified ECU is activated. In S912, the rewriting control unit 220 resumes the program update, based on the status of the update information. For example, the ECU for which the status of the update information includes 'writing' is instructed to perform writing of the update program.

In S904, when the user's consent to the program update has not been acquired, the update processing is started according to the status of the update information, in S920. The processing that is executed in S920 is processing that is executed until the user's consent to the program update is acquired. For example, the processing that is executed in S920 includes processing of receiving an update program from the external apparatus 70, processing of acquiring a user's consent to the program update, processing of writing the update program to an ECU including a double bank memory, and the like.

As described above, according to the control system 200, in a case where the program update cannot be completed due to the battery being removed during the execution of the program update after acquiring the user's consent to the program update, when the battery is remounted and the power supply is restored, the program update is automatically resumed, and the program update processing can be automatically performed until the program update is completed. This makes it possible to promptly use the vehicle 20 when the IG power supply becomes on.

The vehicle 20 is a vehicle as an example of transportation equipment. The vehicle may be an automobile such as an automobile having an internal combustion engine, an electric vehicle and a fuel cell vehicle (FCV). The automobile includes a bus, a truck, a two-wheeled vehicle and the like. The vehicle may be a saddle-type vehicle and the like, and may be a motorcycle. The transportation equipment includes equipment such as an airplane including an unmanned aerial vehicle and a ship, in addition to the vehicle. The transportation equipment may any equipment configured to transport people or goods. The transportation equipment is an example of the mobile object. The mobile object is not limited to the transportation equipment and may be any movable equipment.

Figure 9:
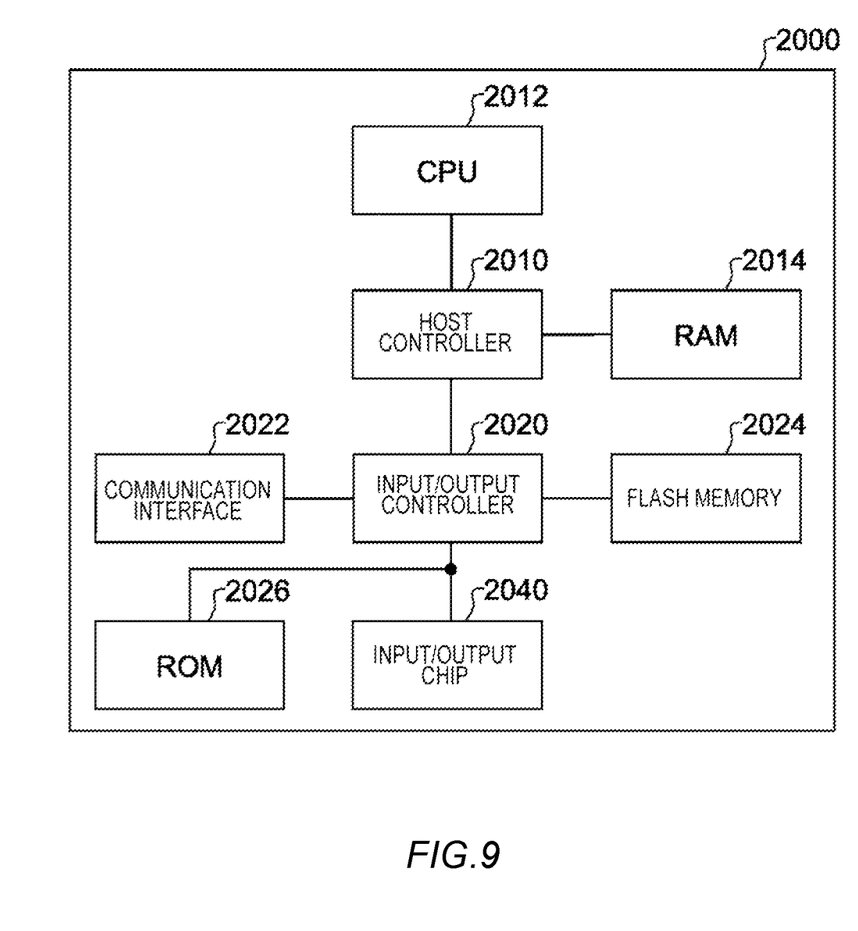
FIG. 9 shows an example of a computer 2000.

FIG. 9 shows an example of a computer 2000 where a plurality of embodiments of the present invention may be entirely or partially embodied. A program that is installed in the computer 2000 can cause the computer 2000 to function as a system such as the control system of the embodiment or each unit of the system or as an apparatus such as an information processing apparatus or each unit of the apparatus, to execute operations associated with the system or each unit of the system or the apparatus or each unit of the apparatus, and/or to execute the process of the embodiment or steps thereof. Such a program may be executed by a CPU 2012 so as to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at boot-up, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing an operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing area provided in a recording medium such as the RAM 2014 and the flash memory 2024, to transmit the read transmission data to the network, and to write reception data received from the network to a reception buffer processing area or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc., in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the control system 200 may work on the CPU 2012 and the like to cause the computer 2000 to function as each unit of the control system 200, respectively. Information processing described in these programs are read into the computer 2000 to cause the computer to function as each unit of the control system 200, which is a specific means realized by cooperation of software and the various types of hardware resources described above. Then, with these specific means, by realizing computing or processing of information according to an intended use of the computer 2000 in the present embodiment, the specific control system 200 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions that can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of processors include computer processors, processing units, microprocessors, digital signal processors, controllers, microcontrollers, and the like.

While the present invention has been described using the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: update system; 20: vehicle; 70: external apparatus; 90: communication network; 200: control system; 201: TCU; 202: ECU; 204: ECU; 205: ECU; 206: ECU; 220: rewriting control unit; 240: acquisition unit; 270: storage unit; 280: in-vehicle communication line; 294: FI; 295: battery; 296: lock-up apparatus; 298: MID; 299: IVI; 2000: computer; 2010: host controller; 2012: CPU; 2014: RAM; 2020: input and output controller; 2022: communication interface; 2024: flash memory; 2026: ROM; 2040: input and output chip

What is claimed is:

1. A program update control apparatus comprising:
a rewriting control unit configured to perform control of rewriting a program, which is executed by a mobile object control unit configured to control at least a part of a mobile object, to a new program, the mobile object including a battery; and
an acquisition unit configured to acquire the new program from an external apparatus, wherein
the rewriting control unit is configured:
when an IG switch of the mobile object is turned off, to cause a display apparatus to display a screen to acquire a consent of a user to the rewriting of the program with the new program;
before starting the rewriting, to request the user to consent to execution of the rewriting;
when the consent of the user is acquired, to hold consent information, which indicates that the user has consented to execution of the rewriting and to cause the rewriting to be started;
when the battery is removed from the mobile object during the rewriting, to cause the rewriting to be ended; and
when activated in response to the battery being remounted on the mobile object, to cause the rewriting to be executed without requesting the user to consent to execution of the rewriting, on a condition that the consent information is held.

2. The program update control apparatus according to claim 1, wherein
the rewriting control unit is configured:
when the battery is remounted on the mobile object after the consent, to sense that the battery is remounted on the mobile object, based on a signal that is output from the battery in response to the battery being remounted on the mobile object, and to be activated by electrical power supplied from the battery, and
when activated by the electrical power supplied from the battery, to cause the rewriting to be executed without requesting the user to consent to execution of the rewriting, on the condition that the consent information is held.

3. The program update control apparatus according to claim 2, wherein
the program update control apparatus is electrically connected to the battery.

4. The program update control apparatus according to claim 2, wherein
the rewriting control unit is configured:
to further hold execution state information indicative of an execution state of the rewriting, and
when activated in response to the battery being remounted on the mobile object, to cause rewriting of the program to be resumed, based on the held execution state information, on the condition that the consent information is held.

5. The program update control apparatus according to claim 4, wherein
the rewriting control unit is configured:
to hold identification information for identifying the mobile object control unit that is an execution target of the rewriting, and
when activated in response to the battery being remounted on the mobile object, to cause the mobile object control unit identified with the identification information to be activated and to cause the mobile object control unit to execute the rewriting, on the condition that the consent information is held.

6. The program update control apparatus according to claim 5, wherein
the mobile object control unit includes a storage unit having a first storage area and a second storage area,
the mobile object control unit is configured to read either a program stored in the first storage area or a program stored in the second storage area at boot-up, and
the rewriting control unit is configured:
when a program that is executed by the mobile object control unit is stored in the first storage area, to cause writing of the new program to the second storage area to be started, and
when activated in response to the battery being remounted on the mobile object, to determine whether the new program is being rewritten, based on the execution state information, on the condition that the consent information is held, and when it is determined that the new program is being rewritten, to cause the mobile object control unit to resume writing of the new program.

7. The program update control apparatus according to claim 5, wherein
the mobile object control unit includes a storage unit having a single storage area in which a program that is executed by the mobile object control unit is stored, and
the rewriting control unit is configured:
when starting the rewriting, to erase an area in which the program in the single storage area is stored and to cause the mobile object control unit to start writing of the new program into the single storage area, and
when activated in response to the battery being remounted on the mobile object, to determine whether the new program is being rewritten, based on the execution state information, on the condition that the consent information is held, and when it is determined that the new program is being rewritten, to cause the mobile object control unit to erase the new program that is being written into the single storage area, and to cause the mobile object control unit to resume writing of the new program.

8. The program update control apparatus according to claim 4, wherein
the mobile object control unit includes a storage unit having a first storage area and a second storage area,
the mobile object control unit is configured to read either a program stored in the first storage area or a program stored in the second storage area at boot-up, and
the rewriting control unit is configured:
when a program that is executed by the mobile object control unit is stored in the first storage area, to cause writing of the new program to the second storage area to be started, and
when activated in response to the battery being remounted on the mobile object, to determine whether the new program is being rewritten, based on the execution state information, on the condition that the consent information is held, and when it is determined that the new program is being rewritten, to cause the mobile object control unit to resume writing of the new program.

9. The program update control apparatus according to claim 4, wherein
the mobile object control unit includes a storage unit having a single storage area in which a program that is executed by the mobile object control unit is stored, and
the rewriting control unit is configured:
when starting the rewriting, to erase an area in which the program in the single storage area is stored and to cause the mobile object control unit to start writing of the new program into the single storage area, and
when activated in response to the battery being remounted on the mobile object, to determine whether the new program is being rewritten, based on the execution state information, on the condition that the consent information is held, and when it is determined that the new program is being rewritten, to cause the mobile object control unit to erase the new program that is being written into the single storage area, and to cause the mobile object control unit to resume writing of the new program.

10. The program update control apparatus according to claim 4, wherein
the program update control apparatus is electrically connected to the battery.

11. The program update control apparatus according to claim 1, wherein
the rewriting control unit is configured:
to further hold execution state information indicative of an execution state of the rewriting, and
when activated in response to the battery being remounted on the mobile object, to cause rewriting of the program to be resumed, based on the held execution state information, on the condition that the consent information is held.

12. The program update control apparatus according to claim 11, wherein
the rewriting control unit is configured:
to hold identification information for identifying the mobile object control unit that is an execution target of the rewriting, and
when activated in response to the battery being remounted on the mobile object, to cause the mobile object control unit identified with the identification information to be activated and to cause the mobile object control unit to execute the rewriting, on the condition that the consent information is held.

13. The program update control apparatus according to claim 11, wherein
the mobile object control unit includes a storage unit having a first storage area and a second storage area,
the mobile object control unit is configured to read either a program stored in the first storage area or a program stored in the second storage area at boot-up, and
the rewriting control unit is configured:
when a program that is executed by the mobile object control unit is stored in the first storage area, to cause writing of the new program to the second storage area to be started, and
when activated in response to the battery being remounted on the mobile object, to determine whether the new program is being rewritten, based on the execution state information, on the condition that the consent information is held, and when it is determined that the new program is being rewritten, to cause the mobile object control unit to resume writing of the new program.

14. The program update control apparatus according to claim 11, wherein
the mobile object control unit includes a storage unit having a single storage area in which a program that is executed by the mobile object control unit is stored, and
the rewriting control unit is configured:
when starting the rewriting, to erase an area in which the program in the single storage area is stored and to cause the mobile object control unit to start writing of the new program into the single storage area, and
when activated in response to the battery being remounted on the mobile object, to determine whether the new program is being rewritten, based on the execution state information, on the condition that the consent information is held, and when it is determined that the new program is being rewritten, to cause the mobile object control unit to erase the new program that is being written into the single storage area, and to cause the mobile object control unit to resume writing of the new program.

15. The program update control apparatus according to claim 1, wherein
the mobile object is a vehicle.

16. The program update control apparatus according to claim 1, wherein
the rewriting control unit is configured to perform control for rewriting the program to the new program by OTA (Over The Air).

17. The program update control apparatus according to claim 16, wherein
the mobile object is a vehicle, and
the mobile object control unit is an ECU (Electronic Control Unit).

18. A mobile object comprising the program update control apparatus according to claim 1.

19. A program update control method comprising:
acquiring, from an external apparatus, a new program to which a program, which is executed by a mobile object control unit configured to control at least a part of a mobile object, is rewritten, the mobile object including a battery;
when an IG switch of the mobile object is turned off, causing a display apparatus to display a screen to acquire a consent of a user to a rewriting of the program with the new program;

before starting the rewriting, requesting the user to consent to execution of the rewriting;

when the consent of the user is acquired, holding consent information, which indicates that the user has consented to execution of the rewriting and causing the rewriting of the program to the new program acquired from the external apparatus to be started;

when the battery is removed from the mobile object during the rewriting, causing the rewriting to be ended; and when a rewriting control unit configured to control the rewriting is activated in response to the battery being remounted on the mobile object, causing the rewriting to be executed without requesting the user to consent to execution of the rewriting, on a condition that the consent information is held.

20. A non-transitory computer-readable storage medium having stored thereon a program that causes a computer to function as:

a rewriting control unit configured to perform control of rewriting a program, which is executed by a mobile object control unit configured to control at least a part of a mobile object, to a new program, the mobile object including a battery; and an acquisition unit configured to acquire the new program from an external apparatus, wherein the rewriting control unit is configured:

when an IG switch of the mobile object is turned off, to cause a display apparatus to display a screen to acquire a consent of a user to the rewriting of the program with the new program;

before starting the rewriting, to request the user to consent to execution of the rewriting;

when the consent of the user is acquired, to hold consent information, which indicates that the user has consented to execution of the rewriting and to cause the rewriting to be started;

when the battery is removed from the mobile object during the rewriting, to cause the rewriting to be ended; and when activated in response to the battery being remounted on the mobile object, to cause the rewriting to be executed without requesting the user to consent to execution of the rewriting, on a condition that the consent information is held.

* * * * *